Oct. 24, 1967  D. M. WILLYOUNG  3,349,264
FIELD COIL CONNECTION FOR FOUR-POLE ROTORS
Filed Oct. 6, 1965  2 Sheets-Sheet 2

THESE 2 POLES WOUND SAME AS NORMAL
POLE TO POLE
POLE TO POLE
THESE 2 POLES WOUND OPPOSITE HAND

INVENTOR:
DAVID M. WILLYOUNG,
BY W. C. Crutcher
HIS ATTORNEY.

United States Patent Office 3,349,264
Patented Oct. 24, 1967

3,349,264
FIELD COIL CONNECTION FOR FOUR-POLE ROTORS
David M. Willyoung, Scotia, N.Y., assignor to General Electric Company, a corporation of New York
Filed Oct. 6, 1965, Ser. No. 493,348
3 Claims. (Cl. 310—185)

This invention relates to an improved arrangement for the windings of dynamoelectric machine rotors, and more particularly to an improved means of connecting the coils of four-pole rotors.

Large dynamoelectric machines, such as steam turbine-generators, sometimes use a four-pole field excitation winding on a rotor turning at 1800 r.p.m. Difficulties are experienced due to the known means of interconnecting the windings producing the magnetic poles on the rotor. Since the outlying coils of adjacent pole windings are physically disposed very close to one another, present arrangements offer the possibility of a short circuit which would inactivate two of the poles, leaving the remaining two poles still activated and in such a location as to distort the magnetic field in the rotor core. This distorted field produces an unbalanced rotating force of great magnitude which can lead to damage of the generator in a very short time.

Another difficulty with a known means of coil interconnection is the cramped condition in the rotor bore hole of a four pole rotor where the connections are made to the field current supply and between adjacent coils. A four-pole rotor often results in reduced copper cross section of the connection bars which can lead to high current density and possible overheating of the conductors, as well as increasing the possibility of short circuit in the bore hole.

Accordingly, one object of the present invention is to provide an improved arrangement for connecting dynamoelectric machine coils in a four-pole rotor so as to prevent damage to the machine in the event of a short circuit.

Another object of the invention is to provide an improved dynamoelectric machine rotor which will serve to give a substantially balanced force on the rotor despite the occurrence of inadvertent short circuit between adjacent coils or in the bore hole.

Another object of the invention is to provide an improven connecting sequence for the winding coils of a dynamoelectric machine rotor with four or more poles.

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawing in which:

Briefly stated, the invention is practiced by providing an insulated stud extending through the rotor spindle so as to enable series connection of diametrically opposed coils of the same magnetic polarity. The winding sequence is such as to provide series current flow furnishing consecutively a north pole, a south pole, a diametrically opposite south pole, and a remaining north pole. The magnetic polarities can of course be the reverse of those specified.

Figure 1:
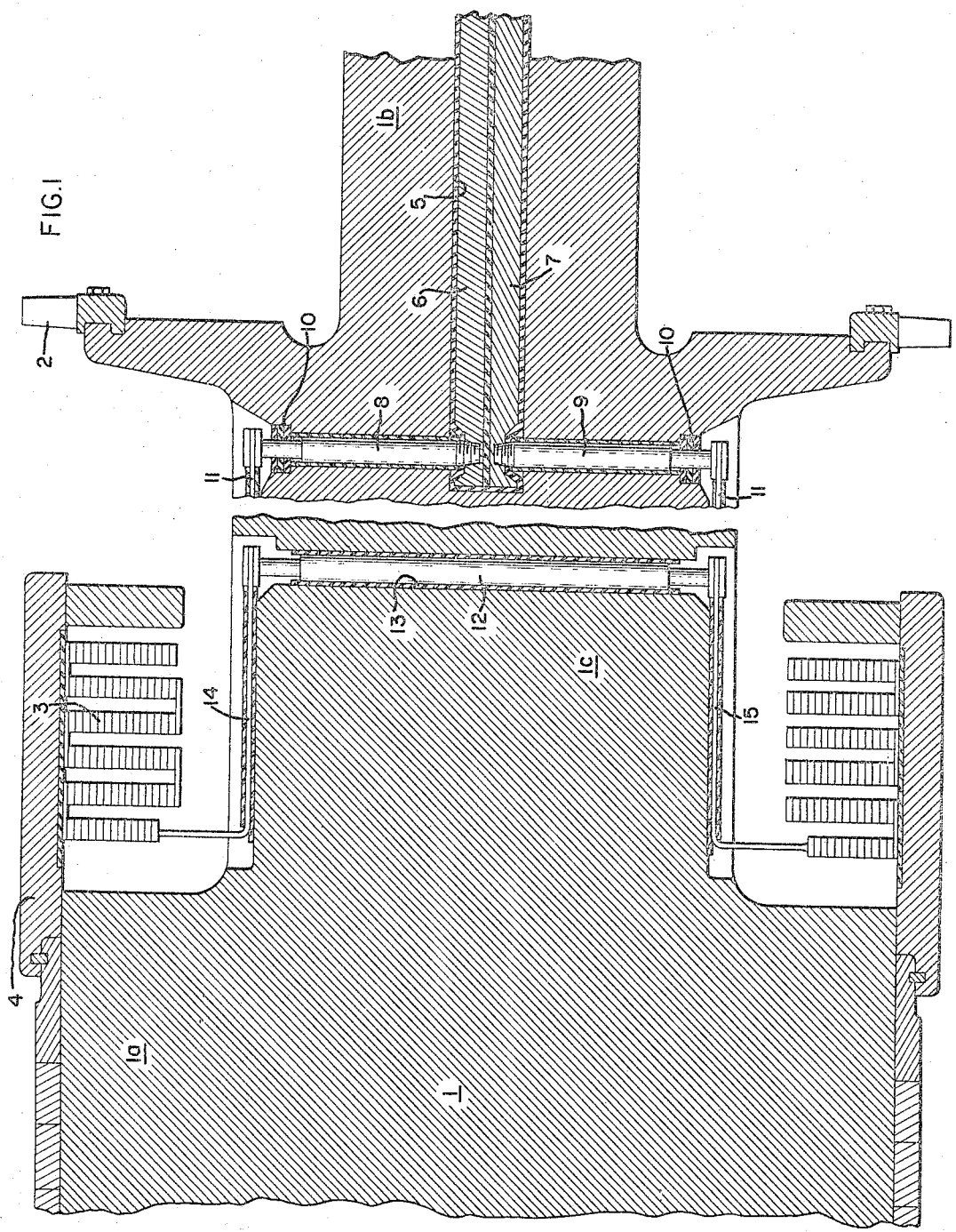
FIG. 1 is a horizontal elevation view, partly in section, of a dynamoelectric machine rotor, with the right-hand portion of the rotor detached and rotated 90°.

Referring now to FIG. 1 of the drawing, a dynamoelectric machine rotor, shown generally as 1, includes a body portion 1a containing longitudinal slots carrying the rotor windings, and a spindle portion 1b for supporting the rotor in bearings (not shown). Disposed between portions 1a, 1b is an intermediate portion 1c on which is arranged a ring of cooling fan blades 2. Outwardly of the intermediate portion are the rotor end turns 3 which are held in place by means of a retaining ring 4. A bore hole 5 along the axis of spindle portion 1b serves to contain connection bars 6, 7 which are insulated from each other and from the spindle as indicated. Radial terminal studs 8, 9, also insulated from the spindle, are electrically connected to the connection bars and are provided with a gas tight seal 10 to prevent escape of hydrogen gas from the enclosed generator casing into the bore hole 5. Main leads 11 are connected to the terminal studs to supply current for DC excitation to the field windings.

The righthand side of FIG. 1, consisting primarily of spindle 1b, is rotated 90° in the drawing from the left-hand portions 1a, 1c. Therefore, disposed 90° from terminal studs 8, 9 and passing diametrically through the rotor is a diametral stud 12 insulated from the rotor by a tube of insulation 13. Opposite ends of the diametral stud 12 are electrically connected to intermediate leads 14, 15 which, in turn, are connected to the lowermost inner coil of the end windings 3. The aforementioned main leads 11 connected to the terminal studs 8, 9, would likewise be connected to end windings 3 in the manner shown on the lefthand side of FIG. 1, but at a location rotated 90° therefrom.

Figure 2:
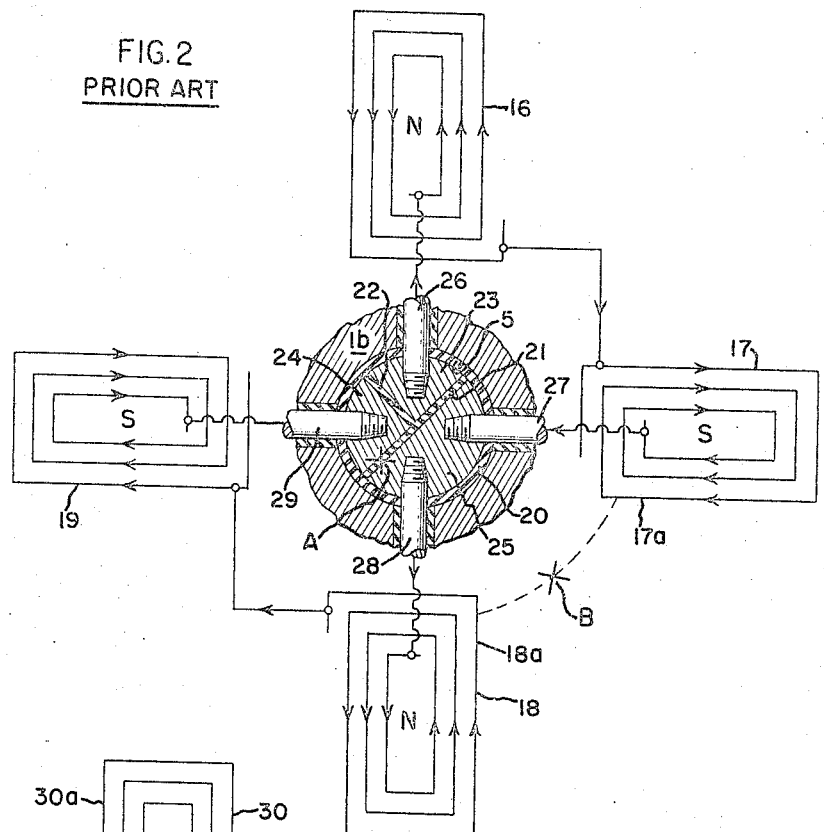
FIG. 2 is a schematic view of a prior art arrangement for connecting the coils of a four-pole rotor.

FIG. 2 shows a prior art means of consecutively connecting windings providing alternating north and south poles of the four-pole rotor. FIG. 2 is a developed view with the pole windings laid out so as to appear perpendicular to one another on the drawing, but it will be understood by those skilled in the art that the windings are, in actuality, parallel to one another and circumferentially spaced around the generator rotor.

FIG. 2 shows a first series winding 16 with the direction of current flow being such as to provide a north pole, a second winding 17 connected in series therewith to provide a south pole, a third winding 18 connected in series therewith to provide another north pole, and a fourth winding 19 providing a south pole. The central part of the drawing represents a cross section taken transversely through the rotor in the vicinity of bore hole 5. Insulated from the rotor and from one another by insulating tube 20 and by insulating strips 21, 22, are the terminal ends of the positive polarity connection bar 23, the negative polarity connection bar 24, and a jumper segment 25. Insulated radial studs 26–29 are connected to conductors 23–25 by pipe threads.

The difficulties arising with the FIG. 2 prior art construction are twofold. First, the terminal ends of the positive and negative leads 23 and 24 must be reduced in size as indicated in order to provide room for the jumper segment 25. This means that much less metal is available for electrical connection to the winding studs 26–29 leading to high current density with the possibility of overheating.

Secondly, and more important, there is a possibility of inadvertent short circuit in the bore hole as indicated at A or between adjacent pole windings at the location indicated by B. The adjacent pole windings have outlying conductors indicated as 17a and 18a. Although these appear far apart on the developed view of the drawing, in reality, they are parallel to one another and closely adjacent. Particularly in the end turn region, they are separated by a small space and there is a possibility of winding movement or foreign objects causing a short circuit between conductors 17a and 18a.

As will be observed, a short circuit at point A will cause the current to by-pass windings 18, 19 and leave only pole windings 16 and 17 active. This causes a substantial unbalanced force on the rotor due to the distortion of the magnetic field therein, which would cause severe vibration in a short time.

Similarly, a short circuit at point B would substantially eliminate the magnetic poles 17, 18 and cause only poles 16, 19 to remain active with the same unbalanced force as before.

Figure 3:
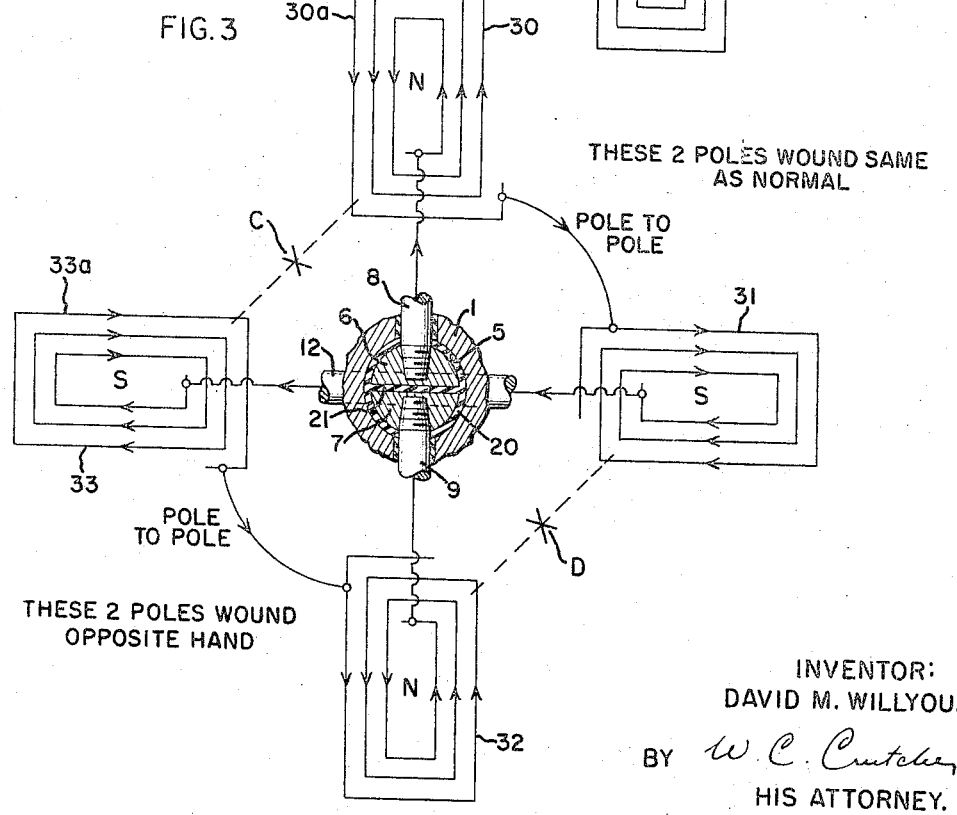
FIG. 3 is a similar schematic view of the rotor coil connections according to the invention.

Referring now to FIG. 3 of the drawing, which is similar to FIG. 2 except that the construction of FIG. 1 is employed, the pole windings are indicated by numerals 30–33. In the central part of the drawing, the reference numerals correspond to those shown in FIG. 1 for like elements and show the attachment of terminal studs 8, 9 to connection bars 6, 7 respectively. Rotated 90° from studs 8, 9 and spaced from the terminating ends of the connection bars 6, 7, as may be seen from an examination of FIG. 1 and FIG. 3 together, is the diametral stud 12.

In order to carry out the invention, the pole windings 30 and 31 are wound in the same manner as FIG. 2, but pole windings 32 and 33 are wound opposite-hand as shown. The manner of connection is such as to provide current flow first through pole winding 30, then through pole winding 31. The end of winding 31 is connected to the diametral stud 12 so as to flow to the diametrically opposite winding 33, which is wound so as to provide a second south pole. Next, the winding 33 is connected to pole winding 32 to provide the remaining north pole, and finally to the terminal stud 9.

It will be observed from an examination of FIG. 3 that the aforementioned difficulties to the prior art construction of FIG. 2 are avoided. First, there is no need for a jumper segment in the bore hole, this function now being provided by the longitudinally spaced diametral stud 12. Therefore, the connection bar segments can be semicircular providing much greater cross-sectional area for connection.

Secondly, and more important, short-circuits between outlying adjacent conductors 30a, 33a of the coils 30, 33, as indicated at point C, or a similar short-circuit at point D, will not avail to cause unbalanced forces on the rotor. By tracing the current flow, it will be seen that a short-circuit at point C will set up a current flow path which will serve to substantially eliminate diametrically opposite pole windings 31, 33 and leave a balanced force on the rotor. Similarly, a short circuit at point D will greatly reduce the effectiveness of opposite windings 31, 33 while not substantially impairing opposite windings 30, 32. In either case, the magnetic fields are balanced with respect to the rotor and do not result in unbalanced forces on the rotor.

While the invention has been illustrated in its preferred form using a diametral stud in a four-pole rotor, other modifications will become apparent to those skilled in the art and it is desired to cover in the appended claims all such modifications as fall within the true spirit and scope of the invention.

What I claim is:

1. A four-pole dynamoelectric machine rotor having four circumferentially spaced poles of alternating first and second magnetic polarity, and having winding coils thereon to provide said poles and electrically connected in series so that current will flow therethrough to provide consecutively a pole of a first magnetic polarity, a pole of a second magnetic polarity, a pole of second magnetic polarity diametrically opposite the preceding pole, and lastly, a pole of first magnetic polarity.

2. The combination according to claim 1 wherein said diametrically opposite poles of the second magnetic polarity are electrically connected by means of an insulated stud passing diametrically through the rotor.

3. A four-pole dynamoelectric machine rotor having four circumferentially spaced poles of alternating first and second magnetic polarity and having winding coils thereon electrically connected in series to provide said poles, a pair of positive and negative connection bars disposed along the rotor axis and insulated therefrom, first and second radial terminal studs electrically connected to the connection bars and also electrically connected to diametrically opposite windings furnishing poles of the first polarity, and a diametral insulated stud passing through the rotor and spaced from said connection bars and electrically connecting diametrically opposite windings furnishing poles of the second polarity.

No references cited.

MILTON O. HIRSHFIELD, *Primary Examiner.*

L. L. SMITH, *Assistant Examiner.*